Oct. 25, 1932.   L. C. HOUSTON   1,883,916
CLOSURE RING FOR BEARINGS
Filed May 17, 1928
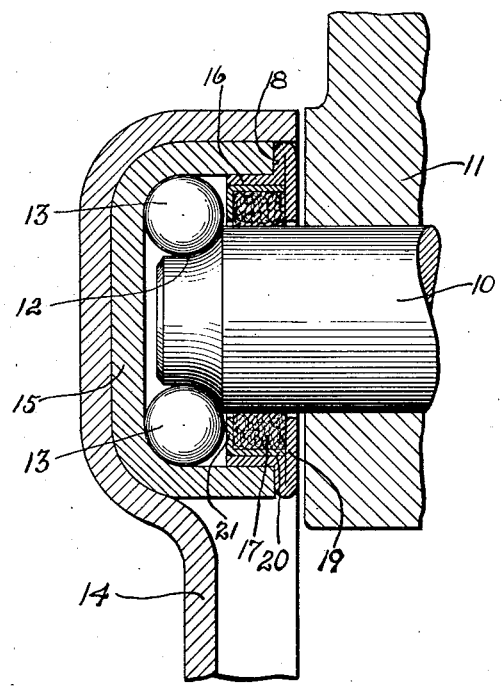
INVENTOR.
L.C. HOUSTON
BY
Mitchell + Bechert
ATTORNEYS.

Patented Oct. 25, 1932

1,883,916

UNITED STATES PATENT OFFICE

LEVI CARTER HOUSTON, OF NEW BRITAIN, CONNECTICUT, ASSIGNOR TO THE FAFNIR BEARING COMPANY, OF NEW BRITAIN, CONNECTICUT, A CORPORATION OF CONNECTICUT

CLOSURE RING FOR BEARINGS

Application filed May 17, 1928. Serial No. 278,484.

This invention relates to a bearing and in particular to a closure member for retaining lubricant and excluding dust therefrom.

It is the principal object of the invention to provide an improved form of closure means for a bearing.

With this and other objects in view, my invention consists in the features of construction and operation set forth in the following specification and illustrated in the accompanying drawing.

In the accompanying drawing annexed hereto and forming a part of this specification I have shown my invention embodied in a closure member for an antifriction bearing adapted particularly for shackles, but it will be understood that the invention can be otherwise embodied and that the drawing is not to be construed as defining or limiting the scope of the invention, the claims appended to this specification being relied upon for that purpose.

In the drawing, the figure shows a cross sectional view of an antifriction bearing having the present invention applied thereto.

In the above mentioned drawing I have shown but one embodiment of the invention which is now deemed preferable, but it is to be understood that changes and modifications may be made within the scope of the appended claims without departing from the spirit of the invention.

Briefly, and in its preferred form, the invention includes a cylindrical member having an end formed of a flange bent back upon itself to form an inwardly and outwardly extending flange, a lubricant retaining member preferably in the form of a felt washer within the closure member adjacent the inwardly extending flange, and a flanged ring retaining the lubricant retaining member within the closure member and against the inwardly extending flange.

In the drawing which illustrates a part of a spring shackle, a shackle pin 10 secured in a member 11 such as an automobile side frame is provided at its outer end with a bearing race surface 12 for antifriction members such as balls 13. Within the shackle link 14 which is to be flexibly connected to the shackle pin 10 and frame member 11 is a suitable recess within which is closely fitted a cup shaped member 15 forming a race surface complementary to that on the pin 10.

In order to retain lubricant within the spaces surrounding the antifriction members 13 and within the cup shaped member 15, a closure member in the form of a cylinder or ring 16 is provided within which is retained a felt or other compressible washer 17 closely engaging the cylindrical portion of the shackle pin 10 forming the journal portion of the bearing. This closure member 16 in the preferred form of the present invention is made of ring form, a cylindrical portion thereof being pressed or forced into the open end of the cup shaped member 15 to engage the internal cylindrical surface of the cup shaped member. An outwardly extending flange 18 integrally formed on this closure ring 16 engages against the open end surface of the cup shaped member 15. This flange 18 is doubled or bent upon itself to form an inwardly extending flange 19 extending inwardly beyond the bore through the ring 16 and loosely surrounding the shackle pin or journal 10. Both flanges 18 and 19 are closely adjacent to each other and are disposed at substantially right angles to the cylindrical portion 16. The lubricant retaining washer 17, preferably of felt, has one end surface adjacent this inwardly extending flange 19 and its internal surface contacts closely with the cylindrical portion of the shackle pin 10.

Preferably, and as shown in the drawing, a thin metal ring 20 with an inwardly extending flange 21 at one end is fitted within the closure ring 16, the flange 21 serving to hold the felt or other washer 17 in operative position in the ring 16.

It will be understood from the above description that lubricant such as grease may be retained within the cup shaped member 15 between the antifriction members 13, and this lubricant will be prevented from escaping by the washer 17 closely engaging the shackle pin 10 and housed within the closure member 16 between the inwardly extending flanges 19 and 21. Also, by reason of this felt or other washer 17, dust will be prevented from entering the bearing.

It will be seen that the closure ring is of very rigid construction for the reason that the double flange is integral with the cylindrical portion of the cup 16. Due to the integral construction, there is no possibility of the end flanges 18—19 becoming disengaged from the main body of the ring 16. Due to the rigid construction of the closure, there is little likelihood that the parts will ever become separated or inoperative in use. The parts of the closure may all be economically manufactured of sheet metal by ordinary pressing operations.

I claim:

1. In a bearing closure, a tubular sheet metal sleeve member having a substantially radially extending flange thereon comprising a return bent flange portion extending radially of said sleeve in one direction and a continuation of a part of said return bent flange portion extending radially of said sleeve in the opposite direction, parts of said return bent flange portion being substantially parallel to and in promixity to each other, a seal member within said sleeve member, and means for holding said seal member in place.

2. In a bearing closure, a sheet metal sleeve member to be passed longitudinally into an opening in a support, said sleeve member having at the outer end an integral substantially radially extending flange portion extending radially outwardly beyond said sleeve portion to contact with the edge of the opening in the support to position said sleeve member in the opening, said flange portion further comprising an integral flange part extending radially inwardly beyond the inner edge of said sleeve, one of said flange portions being formed of a double thickness of metal formed by doubling one of said flange parts upon itself, a seal member adjacent said inwardly extending flange and said sleeve, and holding means for maintaining said seal member in place.

LEVI CARTER HOUSTON.